United States Patent

Tanaka

[11] Patent Number: 4,465,037
[45] Date of Patent: Aug. 14, 1984

[54] SHOCK ABSORBING CAM SHAFT DRIVING SYSTEM

[75] Inventor: Hideo Tanaka, Tokyo, Japan

[73] Assignee: Honda Giken Kogyo Kabushiki Kaisha, Tokyo, Japan

[21] Appl. No.: 367,171

[22] Filed: Apr. 12, 1982

[51] Int. Cl.³ .............................................. F01L 1/02
[52] U.S. Cl. ................................. 123/90.31; 464/90; 464/92; 464/180
[58] Field of Search ........................ 123/90.31, 90.47; 464/89, 90, 92, 155, 156, 180

[56] References Cited

U.S. PATENT DOCUMENTS

| | | | |
|---|---|---|---|
| 1,375,067 | 4/1921 | Short | 123/90.31 |
| 1,980,379 | 11/1934 | Burnett | 123/90.31 |
| 2,307,129 | 1/1943 | Hines et al. | 464/89 |
| 2,785,580 | 3/1957 | Andrews | 464/92 |
| 2,857,773 | 10/1958 | Slonek | 123/90.31 |
| 4,305,352 | 12/1981 | Oshima et al. | 123/90.31 |

Primary Examiner—Ira S. Lazarus
Assistant Examiner—R. S. Bailey
Attorney, Agent, or Firm—Armstrong, Nikaido, Marmelstein & Kubovcik

[57] ABSTRACT

A new and unique valve actuating cam shaft driving system for rotating a cam shaft to actuate suction and exhaust valves of an internal combustion engine, which comprises a driving gear on a crankshaft, a shock absorbing gear assembly rotatably mounted on an intermediate shaft and a plurality of power transmission gears, said shock absorbing gear assembly including two gears, one of them meshing with the driving gear while the other one meshing with one of the power transmission gears. The shock absorbing gear assembly has a shock absorbing member incorporated therein for preventing any vibration or shock from being transmitted to the valve actuating cam shaft. Further, one of the power transmission gears which is rotatably mounted on the cam shaft has a shock absorbing member incorporated therein in the same manner as that in the shock absorbing gear assembly. The shock absorbing member is press fitted into a space as defined by a pair of coaxially arranged inner and outer rings and its inner and outer circumferences are fixedly secured to the rings by way of a suitable thermal treatment.

4 Claims, 2 Drawing Figures

SHOCK ABSORBING CAM SHAFT DRIVING SYSTEM

BACKGROUND OF THE INVENTION

1. Field of the Invention

The present invention relates to a valve actuating cam shaft driving system for an internal combustion engine in which a power output gear integrally formed on a crankshaft is operatively connected to a speed change gearing mechanism via an intermediate gear on an intermediate shaft and further the crankshaft is operatively connected to a valve actuating cam shaft adapted to actuate suction and exhaust valves.

2. Description of the Prior Art

It has been hitherto known that a conventional valve actuating cam shaft driving system often suffers from a few drawbacks during a high speed operation of an engine, such as lowering of the operational stability of a valve actuation system, stoppage of increase in engine output, minor mechanical trouble in the valve actuating system or the like. To obviate these drawbacks it has been proposed that the valve actuating system is provided with a shock absorbing device incorporated therein. However, the proposed shock absorbing device had to be constructed in a large size in order to ensure its sufficient shock absorbing function. Obviously, it is very difficult to employ the proposed large shock absorbing device because such device requires a wide space for mounting.

SUMMARY OF THE INVENTION

The present invention is proposed to overcome the drawbacks encountered in the conventional valve actuating cam driving system as mentioned above by way of the optimum utilization of a dead space formed around an intermediate shaft located between the crankshaft and the speed change gearing mechanism. Specifically, a shock absorbing gear assembly having a large capacity is arranged in the above dead space so that any vibration or shock is effectively absorbed during a high speed operation of the engine.

More specifically, the valve actuating cam shaft driving system for an internal combustion engine according to the present invention comprises a driving gear on a crankshaft, a plurality of power transmission gears operatively connected with a cam shaft, and a shock absorbing gear assembly arranged between the driving gear and the power transmission gears, said shock absorbing gear assembly rotatably mounted on an intermediate shaft and having two gears, one of the gears meshing with the driving gear while the other one meshing with one of the power transmission gears, whereby a rotational force is transmitted from the driving gear to the cam shaft with vibration, shock or the like undesirable movement being substantially removed.

In a preferred embodiment of the present invention, the shock absorbing gear assembly includes coaxially arranged inner and outer rings rotatably mounted on the intermediate shaft and a shock absorbing member disposed between both the inner and outer rings to ensure a resilient connection between those rings, said inner ring having an output gear integrally formed at a part thereof so as to mesh with one of the power transmission gears, while said outer ring having a input gear integrally formed on the outer circumference thereof so as to mesh with the driving gear.

Preferably, the shock absorbing member includes a pair of coaxially arranged inner and outer rings located in a radially spaced relation to each other and an annular resilient means made of rubber or the like material. The annular resilient means is usually press fitted into the space as defined by the inner and outer rings and the inner and outer circumferences thereof are fixedly adhered to those rings by way of a suitable thermal treatment.

One of the power transmission gears is rotatably mounted on the crankshaft, whereas another one is rotatably mounted on the cam shaft with a shock absorbing member incorporated therein.

Thus, it is an object of the present invention to provide an improved valve actuating cam shaft driving system which ensures that a rotational force is transmitted from the crankshaft to the cam shaft with any vibration, shock or the like substantially absorbed and removed so that suction and exhaust valves are steadily actuated by the cam shaft under any operation condition of the engine.

It is another object of the present invention to provide a valve actuating cam shaft driving system which is constructed in a small size and is simple in structure.

It is a further object of the present invention to provide a valve actuating cam shaft driving system which is manufactured at a low cost.

Other objects and advantageous features of the present invention will be apparent from the reading of the following description made in connection with the accompanying drawings.

BRIEF DESCRIPTION OF THE DRAWINGS

Now the present invention will be described in more details with reference to the accompanying drawings which illustrate a preferred embodiment of the invention, in which.

DETAILED DESCRIPTION OF THE PREFERRED EMBODIMENT

Figure 1:
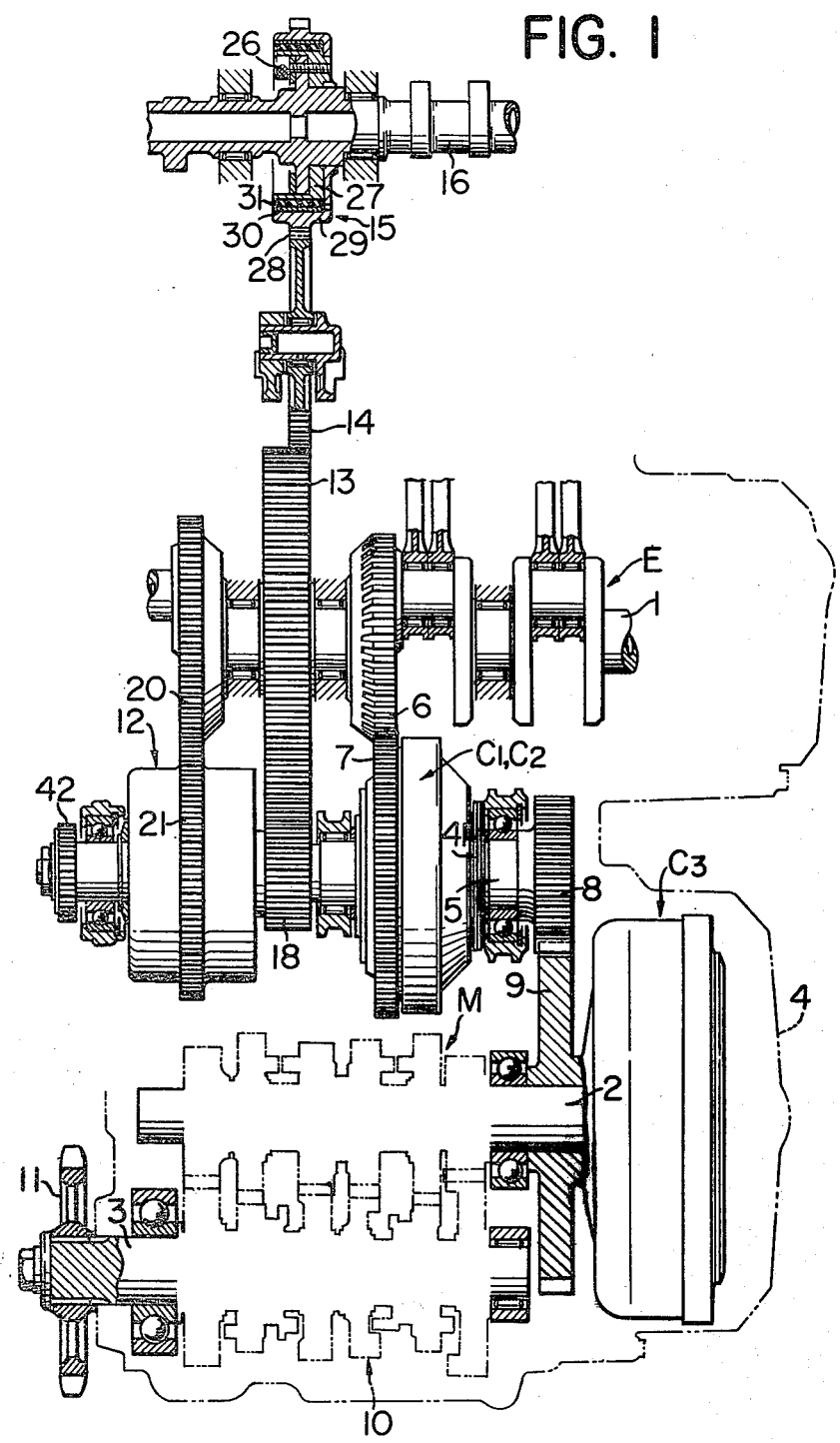
FIG. 1 is a schematic illustration of a valve actuating cam shaft driving system in accordance with the present invention which is typically employed for a motorcycle.

Referring to FIG. 1, reference letter E designates an internal combustion engine and reference letter M does a transmission mechanism. A crankshaft 1 of the engine E, a main shaft 2 and a secondary shaft 3 in the transmission mechanism M are incorporated in a common casing 4 so that they are combined in a single unit.

Between the crankshaft 1 and the main shaft 2 is provided an intermediate shaft 5 extending in parallel to them. The intermediate shaft 5 includes a one-way clutch $C_1$ and a frictional clutch $C_2$ arranged in juxtaposition to each other and a power input gear 7 is operatively mounted on said one-way clutch $C_1$. The gear 7 meshes with a power output gear 6 formed on a crank web of the crankshaft 1.

The intermediate shaft 5 includes an intermediate gear 8 fixedly secured thereto at the power output end, said intermediate gear 8 meshing with a power input gear 9 for a conventional manually operated clutch $C_3$ at the power input end of the main shaft 2.

Between the main shaft 2 and the secondary shaft 3 is provided a conventional speed change gearing mechanism 10 by way of which they are in operative connection with each other, wherein the secondary shaft 3 includes a sprocket 11 fixedly secured thereto at the power output end, said sprocket 11 being adapted to operatively rotate a chain (not shown) for the purpose of driving a rear wheel for the motorcycle.

Next, the one-way clutch $C_1$ and frictional clutch $C_2$ will be described in a greater detail with reference to FIG. 2.

First, the one-way clutch $C_1$ essentially comprises an inner clutch member 32 spline fitted on the intermediate shaft 5, an outer clutch member 33 at a boss 7a of the power input gear 7 within which said inner clutch member 32 is included, and a sprag 34 located intermediate both the inner and outer clutch members 32 and 33, said boss 7a being rotatably mounted on the inner clutch member 32 and an outer clutch boss 38b of the frictional clutch $C_2$ to be described later with ball bearings 35 and 36 disposed therebetween. Specifically, the one-way clutch $C_1$ is constructed such that the inner and outer clutch members 32 and 33 come in operative engagement with each other due to the locking function of the sprag 34 when they are subjected to a forward load during the operation of the engine E, while they come out of operative engagement when they are subjected to a backward load.

In the meanwhile, the frictional clutch $C_2$ essentially comprises an inner clutch member 37 on the boss 7a of the power input gear 7, an outer clutch member 38 surrounding said inner clutch member 37, a plurality of frictionally driving discs 39 slidably spline fitted onto said inner clutch member 37 and a plurality of frictionally driven discs 40 slidably spline fitted into said outer clutch member 38, wherein the outer clutch member 38 includes a side plate 38a which is located opposite to the power input gear 7 with the group of frictionally driving and driven discs 39 and 40 interposed therebetween. In addition, belle-ville springs 41 are located behind side plate 38a so as to resiliently press the frictional discs 39 and 40. Specifically, the belleville springs 41 serve for predetermining a frictional engagement force among the group of frictional discs 39 and 40 imparted thereto by way of the side plate 38a. Thus, a required slip torque is predetermined.

The outer clutch member 38 includes a boss 38b located at the central part of the side plate 38a, said boss 38b being slidably spline fitted on the intermediate shaft 5 in such a manner as not to prevent both the frictional discs 39 and 40 from being slidably thrusted by means of the side plate 38a.

A rotational force is transmitted from the crankshaft 1 to a valve actuating cam shaft 16 by way of a valve actuating cam shaft driving system in accordance with the present invention, said valve actuating cam shaft 16 being adapted to actuate both suction and exhaust valves.

Now the valve actuating cam shaft driving system will be described in a greater detail as follows.

The crankshaft 1 is operatively connected to the valve actuating cam shaft 16 by way of a driving gear 20 symmetrically arranged relative to the power output gear 6 formed on the outer circumference of the crank web, a shock absorbing gear assembly 12 rotatably mounted on the intermediate shaft 5, the first transmission gear 13 rotatably mounted on the crankshaft 1, the second transmission gear 14 and a driven gear 15.

Figure 2:
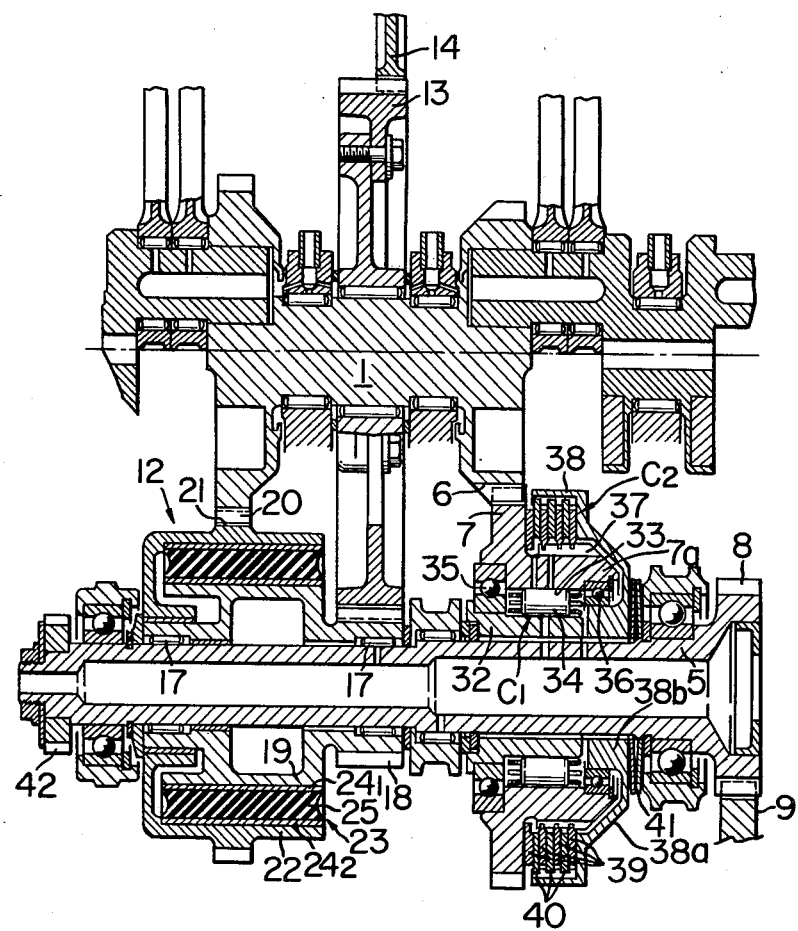
FIG. 2 is a sectional view of an essential part of the valve actuating cam shaft driving system in FIG. 1, shown in an enlarged scale.

As is readily apparent from FIG. 2, said shock absorbing gear assembly 12 is rotatably fitted onto the intermediate shaft 5 with needle bearings 17 interposed therebetween. Specifically, the shock absorbing gear assembly 12 comprises an inner ring 19 having an output gear 18 integrally formed at the right end part thereof, said output gear 18 meshing with the first transmission gear 13, an outer ring 22 coaxially arranged outside of said inner ring 19 in a spaced relation thereto, said outer ring 22 having an input gear 21 integrally formed on the central part of the outer circumference thereof, said input gear 21 meshing with the driving gear 20 of the crankshaft 1, and a shock absorbing unit 23 interposed between the inner and outer rings 19 and 22 so as to ensure resilient connection therebetween. Further, said shock absorbing unit 23 comprises a pair of coaxially arranged inner and outer rings $24_1$ and $24_2$ and an annular resilient member 25 made of rubber or the like material, said annular resilient member 25 being press fitted into a space as defined by both the inner and outer rings $24_1$ and $24_2$ and its inner and outer circumferences being fixedly adhered to the inner and outer rings $24_1$ and $24_2$ by way of any suitable thermal treatment. Thus, a driving force transmitted to the outer ring 22 of the shock absorbing gear assembly 12 via the driving gear 20 on the crankshaft 1 is transmitted further to the inner ring 19 via the shock absorbing unit 23, while vibratory displacement of the inner and outer rings 19 and 22 relative to each other is effectively absorbed with the aid of the annular resilient member 25 containing shock absorbing material therein.

Further, the driven gear 15 on the valve actuating cam shaft 16 includes an inner ring 27 fixedly mounted on the valve actuating cam shaft 16 by means of bolts 26, an outer ring 29 coaxially arranged outside of said inner ring 27 in a spaced relation so as to be freely rotatable relative to the valve actuating cam shaft 16, said outer ring 29 being integrally formed with a gear 28 on the outer circumference thereof which meshes with the second transmission gear 14, and an annular shock absorbing member 31 made of resilient material such as rubber or the like with a ring 30 fixedly adhered to the outer circumference by way of any suitable thermal treatment, whereby any vibratory displacement of the inner and outer rings 27 and 29 with respect to each other is successfully absorbed by means of the annular shock absorbing member 31 interposed between those rings 27, 29.

It should be noted that in FIG. 2 reference numeral 42 designates a gear for driving an engine coolant pump which is not shown in the drawing.

Now operation of the valve actuating cam shaft driving system of the invention will be described below.

When a forward load is applied to the engine E, an output torque from the crankshaft 1 is transmitted from the power output gear 6 to the power input gear 7 and then it is distributed to the one-way clutch $C_1$ and frictional clutch $C_2$ disposed in juxtaposition relative to each other. Since the one-way clutch $C_1$ is brought in operative engagement while a forward load is applied thereto, as mentioned above, rotational torque distributed to the one-way clutch $C_1$ is transmitted to the intermediate shaft 5 via the outer clutch member 33, the sprag 34 and the inner clutch member 32, whereas another rotational torque distributed to the frictional clutch $C_2$ is also transmitted to the intermediate shaft 5 via the inner clutch member 37, the group of frictionally driving discs 39, the group of frictionally driven discs 40 and the outer clutch member 38. Thus, provided that an output torque from the crankshaft 1 is in excess of a certain slip torque specified to the frictional clutch $C_2$ for some reason, the excessive rotational torque is transmitted to the intermediate shaft 5 through the one-way clutch $C_1$ without causing any slippage at the frictional clutch $C_2$. As a result an output torque from the crankshaft 1 is effectively transmitted to the intermediate shaft 5 and then it is further transmitted to the driving sprocket 11 via the gears 8 and 9, the manually operated clutch $C_3$ and the transmission mechanism M, driving a rear wheel (not shown).

On the other hand, when a backward load is applied to the engine E, for example, when the travelling condition is shifted from a high speed running to a decelerated one, a driving torque delivered to the rear wheel from the travelling road is reversely transmitted to the crankshaft 1 by way of the above-mentioned power transmission line. In this case the intermediate shaft 5 assumes a driving side position relative to the power input gear 7. Therefore, the one-way clutch $C_1$ is brought in a disengaged state to transmit the driving torque from the rear wheel through the intermediate shaft 5 to the power input gear 7 only by way of the frictional clutch $C_2$. When the driving torque is in excess of the above slip torque specified to the frictional clutch $C_2$ for any reason, a slippage takes place between the group of frictionally driving discs 39 and the group of frictionally driven discs 40, whereby the backward load to be transmitted to the engine E is maintained within the specified range.

Further, rotation of the crankshaft 1 is transmitted to the valve actuating cam shaft 16 via the driving gear 20, the shock absorbing gear assembly 12, the first transmission gear 13, the second transmission gear 14 and the driven gear 15, so that suction and exhaust valves are actuated by way of a valve actuating mechanism including valve actuating cams and others (not shown) as the valve actuating cam shaft 16 is rotated.

Now it is assumed that the engine E is operated at a high speed and the valve actuating system is subjected to vibration. Owing to the arrangement as described above a substantial part of vibration is absorbed by means of the shock absorbing unit 23, i.e. the residual member 25 made of shock absorbing material, which is interposed between the inner and outer rings 19 and 22 of the shock absorbing gear assembly 12 and the residual one is absorbed by the annular shock absorbing member 31 interposed between the inner and outer rings 27 and 29 in the driven gear 15.

In case that the shock absorbing gear assembly 12 can pose a sufficiently high shock absorbing effect, the shock absorbing member 31 and the inner ring 27 of the driven gear 15 may be eliminated and the outer ring 29 may be directly secured to the cam shaft 16.

According to the present invention as described above, the valve actuating cam shaft driving system for an internal combustion engine is constructed such that a power input gear integrally formed on a crankshaft is in operative connection with a speed change gearing mechanism via an intermediate gear on an intermediate shaft and a shock absorbing gear assembly is rotatably arranged so as to transmit a rotational force to the intermediate shaft while absorbing a vibration, said shock absorbing gear assembly meshing at one side with a driving gear mounted on the crankshaft and at the other side with power transmission gears which are in operative connection with a valve actuating cam shaft adapted to actuate suction and exhaust valves. Thus, it is ensured that the dead space formed around the intermediate shaft is effectively utilized for the optimum arrangement of the shock absorbing gear assembly, as a consequence of which sufficient shock absorbing effect is attained by means of a relatively large sized shock absorbing gear assembly and the system as a whole can be constructed in a compact size irrespective of such a bulky arrangement of the shock absorbing gear assembly.

Further, the valve actuating cam shaft driving system is constructed such that any vibration or shock which may be transmitted from the crankshaft to the valve actuating system is substantially absorbed by a shock absorbing gear assembly having an excellent shock absorbing capability in an effective manner. Thus, it is ensured that the valve actuating system is actuated at an excellent stability even when an engine is operated at a high speed, necessitating no increased mechanical strength of the respective parts and components in the valve actuating system, resulting in that the whole system can be manufactured at a low cost.

In the foregoing description, for the shock absorbing device, a gear transmission is employed including the shock absorbing gear assembly 12 but in place thereof, any type of transmission device such as a pulley and belt transmission, a cog wheel and belt transmission and the like can also be used.

What is claimed is:

1. In an internal combustion engine having a crankshaft and a valve actuating cam shaft, a driving system for said cam shaft comprising:
   a driving gear fixed on said crankshaft;
   a power transmission gear for driving said cam shaft;
   a driven gear fixed to said cam shaft and driven by said power transmission gear;
   an intermediate shaft; and
   a shock absorbing gear assembly rotatably mounted on said intermediate shaft, said shock absorbing gear assembly including an input gear meshing with and driven by said driving gear, an output gear meshing with and driving said power transmission gear, and an annular resilient shock absorbing member coaxial with said intermediate shaft interposed between and resiliently connecting said input gear and said output gear, whereby rotational force is resiliently transmitted from said driving gear to said power transmission gear through said shock absorbing gear assembly.

2. A driving system for a cam shaft as claimed in claim 1 wherein said shock absorbing gear assembly comprises an inner annular ring formed integral with said output gear and rotatably mounted on said intermediate shaft, an outer annular ring formed integral with said input gear and positioned radially outward from and coaxial with said inner annular ring, and wherein said annular resilient shock absorbing member is made of rubber-like material positioned radially between said inner and outer rings and fixedly adhered thereto.

3. A driving system for a cam shaft as claimed in claim 1 or claim 2 wherein said power transmission gear is rotatably mounted on said crankshaft.

4. A driving system for a cam shaft as claimed in claim 1 wherein said driven gear fixed to said cam shaft comprises a second inner ring mounted on said cam shaft, a second outer ring coaxially arranged outside said second inner ring and having gear teeth formed on the outside surface thereof operatively connected with said power transmission gear, and a second annular resilient shock absorbing member interposed radially between said second inner ring and said second outer ring and fixedly adhered thereto.

* * * * *